(12) United States Patent
Gupta et al.

(10) Patent No.: US 11,558,263 B2
(45) Date of Patent: Jan. 17, 2023

(54) NETWORK DEVICE ASSOCIATION WITH NETWORK MANAGEMENT SYSTEM

(71) Applicant: HEWLETT PACKARD ENTERPRISE DEVELOPMENT LP, Houston, TX (US)

(72) Inventors: Gopal Gupta, Bangalore (IN); Jacob Philip Michael, Bangalore (IN); Amit Kumar Gupta, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 115 days.

(21) Appl. No.: 17/223,598

(22) Filed: Apr. 6, 2021

(65) Prior Publication Data

US 2022/0014446 A1 Jan. 13, 2022

(30) Foreign Application Priority Data

Jul. 10, 2020 (IN) .............................. 202041029481

(51) Int. Cl.
*H04L 41/16* (2022.01)
*H04L 41/5041* (2022.01)

(52) U.S. Cl.
CPC .......... *H04L 41/16* (2013.01); *H04L 41/5041* (2013.01)

(58) Field of Classification Search
CPC ............................. H04L 41/16; H04L 41/5041
See application file for complete search history.

(56) References Cited

U.S. PATENT DOCUMENTS

| | | | |
|---|---|---|---|
| 6,047,279 A | 4/2000 | Barrack et al. | |
| 8,892,446 B2 * | 11/2014 | Cheyer | H04M 1/6091 704/251 |
| 9,325,575 B2 | 4/2016 | Gray et al. | |
| 9,525,589 B2 | 12/2016 | Pignataro et al. | |
| 9,742,873 B2 * | 8/2017 | Ananthanarayanan | G06F 9/5072 |

(Continued)

FOREIGN PATENT DOCUMENTS

| | | |
|---|---|---|
| CN | 105809248 A | 7/2016 |
| WO | 2019/006649 A1 | 1/2019 |

OTHER PUBLICATIONS

Cisco, "Cisco DNA Center," Network Management and Automation, retrieved online Mar. 3, 2020 at http://www.cisco.com/c/en_in/products/cloud-systems-management/dna-center/index.htm.

*Primary Examiner* — Sargon N Nano
(74) *Attorney, Agent, or Firm* — Hewlett Packard Enterprise Patent Department

(57) ABSTRACT

Examples described herein provide for associating a network device to a network management system (NMS). Examples herein include determining, by a network orchestrator, a set of embeddings indicative of characteristics of the network device and each of a plurality of instances of the NMS. Examples herein include determining, by the network orchestrator for each of the plurality of instances, a probability score based on the set of embeddings, wherein the probability score is indicative of a likelihood of the network device to be associated with the instance. Examples herein further include, based on the probability score for each of the plurality of instances, selecting, by the network orchestrator, a first instance of the plurality of instances to associate with the network device. Examples herein include associating, by the network orchestrator, the network device to the first instance.

20 Claims, 5 Drawing Sheets

(56) References Cited

U.S. PATENT DOCUMENTS

| | | | |
|---|---|---|---|
| 9,973,467 B2 | 5/2018 | Dhulipala et al. | |
| 10,333,789 B1* | 6/2019 | Dippenaar | H04L 63/00 |
| 10,924,943 B2* | 2/2021 | Chou | H04W 24/02 |
| 2010/0046398 A1 | 2/2010 | Yang et al. | |
| 2012/0324063 A1 | 12/2012 | Wang et al. | |
| 2017/0353991 A1* | 12/2017 | Tapia | H04L 41/0631 |
| 2019/0066046 A1* | 2/2019 | Nathani | G06Q 10/0836 |
| 2019/0197397 A1 | 6/2019 | Verma et al. | |
| 2019/0280918 A1* | 9/2019 | Hermoni | H04L 41/0604 |
| 2020/0106714 A1* | 4/2020 | Cote | H04L 47/822 |
| 2020/0382527 A1* | 12/2020 | Mitelman | G06N 3/082 |
| 2021/0083926 A1* | 3/2021 | Costa | H04L 41/0813 |
| 2021/0377114 A1* | 12/2021 | Nelson | H04L 41/12 |
| 2022/0156235 A1* | 5/2022 | Ly | G06F 16/906 |

* cited by examiner

NETWORK DEVICE ASSOCIATION WITH NETWORK MANAGEMENT SYSTEM

BACKGROUND

Networks may include a plurality of resources connected by communication links, and may be used to connect people, provide services (e.g., internally and/or externally via the Internet and/or intranet), and/or organize information, among other activities associated with an entity. For instance, a network may include a variety of network devices, such as access points, controllers, gateways, switches, etc., which perform different network operations, such as network access, authentication, and routing network traffic to provide connectivity.

A network may include a network management system (NMS) for monitoring performance and management of network devices in the network. An NMS may include multiple instances, each of which may identify, configure, monitor, update, and troubleshoot network devices in a large-scale network, such as an enterprise network. Moreover, an NMS may include one or more applications to enable network device discovery, network device monitoring, network performance analysis, network device management, intelligent notifications, customizable alerts, or a combination thereof. Furthermore, an NMS may include a system management control application that displays the performance data collected from each network device and enable network administrator to make necessary modifications.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
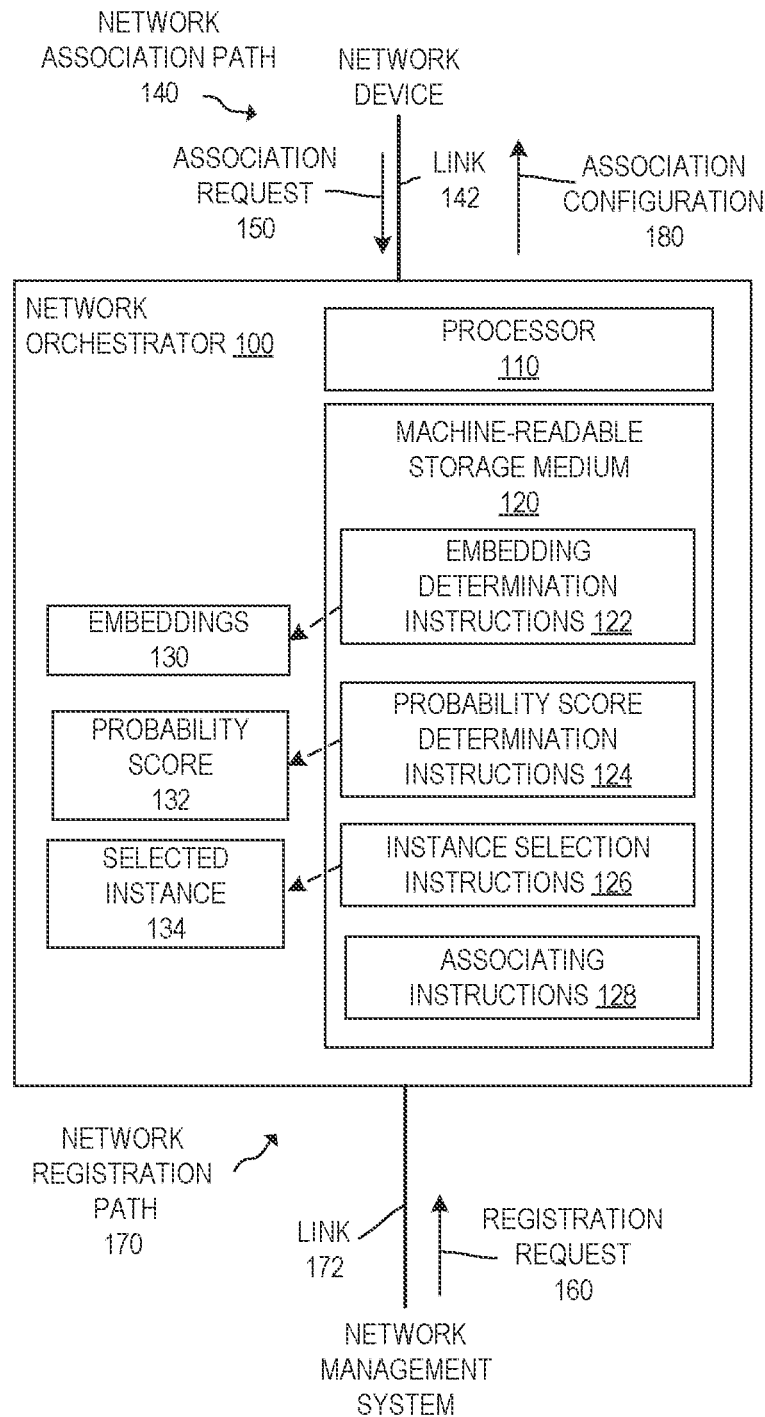
FIG. 1 is a block diagram of an example network orchestrator for associating a network device to a network management system.

Large-scale networks, such as enterprise networks, may comprise a plurality (e.g., hundreds of thousands) of network devices (e.g., wireless access points, controllers, gateways, switches etc.). The larger the size of the network, greater the number of network devices that may need to be deployed in the network. In such large-scale networks, multiple NMS instances may need to be deployed to manage different network devices (such as wireless access points (WAPs), switches, routers, gateways, etc.). In an example, one NMS instance may manage up to a certain number of network devices. In other words, there may be a limit to the number of network devices that can be managed by a single instance of an NMS. Thus, in the large-scale networks, multiple NMS instances are deployed, where the network devices are associated with respective instances of NMS which manage those network devices. As the network grows, new network devices may be required to be deployed in the network to increase its coverage area. Such newly deployed network devices are needed to be associated with respective NMS instances which will manage those network devices.

For instance, consider an enterprise network that comprises 30,000 network devices deployed on-premise. In such example, eight NMS instances may need to be deployed to manage the 30,000 network devices. Furthermore, in such example, consider that 1,000 new network devices are to be deployed as a part of the enterprise network. Generally, the network administrator would need to manually configure each newly added network device to be associated (i.e., registered) with one of the available NMS instances. The manual configuration of each new network device involves: (a) manual evaluation of the network (such as network health, NMS health, network device capabilities, NMS feature support, etc.) and selection, based on the manual evaluation, of a NMS instance to associate with the newly added network devices; and (b) manual configuration of a network address (such as a Uniform Resource Locator (URL)) of the selected NMS instance at a location in the network where the network device can discover the NMS instance.

However, due to the size and complexity of large-scale networks, the manual evaluation of the network may be error-prone and repetitive. Further, the NMS instance selected by the network administrator based on manual evaluation of the network may not function in an intended manner with dynamic changes in performance characteristics or traffic load of the network device. Thus, the network may suffer from poor network management and/or network throughput may be reduced.

The above-mentioned issues with manual evaluation and configuration may be partly resolved by replacing multiple NMS instances in the network with a single clustered NMS, that supports a large variety (i.e., device/model type) of network devices. A clustered NMS may include a pool of computing instances (also called nodes) that may be connected via a network. In an example, each node in the cluster may be a bare metal server located in close physical proximity to the other nodes. The connected nodes in a cluster may work together so that they may be viewed as a single system. The instances of NMS may run on virtual machines (VMs) in the nodes of the cluster. However, implementation of a clustered NMS may require setting up new blade server(s) and additional network infrastructure for communication between the nodes of the cluster. These infrastructure changes may require large financial investment. Also, data migration from individual NMS instances to the clustered NMS may be time consuming and may involve manual effort. In addition, the clustered NMS may be required to be enhanced with intelligent algorithms to utilize its resources efficiently by considering various factors related to the network and network devices. Further, the issues with manual evaluation of the network and manual configuration of the network devices may still exist in the clustered NMS deployment.

The present disclosure relates to associating a network device with one of a plurality of instances of an NMS, where one of the instances is selected according to a probability score which is determined based on characteristics of the network device and the instances of the NMS. According to the present disclosure, a set of embeddings indicative of characteristics of the network device and each of a plurality of instances of the NMS may be determined. Based on the set of embeddings, a probability score of each of the plurality of instances of the NMS is determined. The probability score is indicative of a likelihood of the network device to be associated with each of the plurality of instances of the NMS. Based on the probability score of each of the plurality of instances of the NMS, one of the instances of the NMS is selected to associate with the network device. The network device is then associated with the selected one of the instances of the NMS.

In this manner, examples described herein may associate a network device with an NMS. For instance, association of the network device with the selected instance of the NMS according to the determined probability scores of the instances of the NMS may reduce or eliminate manual intervention by the network administrator in configuring the network device, thereby avoiding errors that could arise during manual evaluation of the network and selection of an instance of the NMS by a network administrator. Further, the present disclosure also allows the selection of the instance of the NMS to account for changes in characteristics of the network device or NMS during operation in the network, thereby dynamically optimizing the performance of the network devices.

Referring now to the drawings, FIG. 1 is a block diagram of an example network orchestrator 100 for associating a network device to a network management system. Network orchestrator 100 includes at least one processor 110 and at least one machine-readable storage medium 120 comprising (e.g., encoded with) at least embedding determination instructions 122, probability score determination instructions 124, instance selection instructions 126, and associating instructions 128 that are executable by the at least one processor 110 of network orchestrator 100 to implement functionalities described herein in relation to embedding determination instructions 122, probability score determination instructions 124, instance selection instructions 126, and associating instructions 128. In addition, network orchestrator 100 may engage in any network data transmission operations, including, but not limited to, switching, routing, bridging, or a combination thereof. The network orchestrator 100 may comprise any suitable type(s) of computing device(s) for associating a network device to an instance of an NMS. Moreover, network orchestrator 100 may include any necessary hardware components to perform the inventions disclosed herein, including, but not limited to: processors, memories, display devices, input devices, communications equipment, etc. In an example, the network orchestrator 100 may be implemented as part of an NMS and/or may comprise one or more cloud-based resources.

In the example of FIG. 1, network orchestrator 100 may be configured (e.g., encoded with instructions executable by at least one processor 110) to receive an association request 150 via network association path 140 to associate a network device with one of a plurality of instances of an NMS. Network association path 140 may include any suitable communication link 142 (e.g., wired or wireless, direct or indirect, etc.) between network orchestrator 100 and a network.

In examples described herein, a "network association path" may include a combination of hardware (e.g., communications interfaces, communication links, etc.) and instructions (e.g., executable by a processor) to communicate (e.g., receive, send, etc.) a command (e.g., association request 150) with an external resource (server, cloud resource, etc.) connected to the network.

The association request 150 may originate from a network device (such as a WAP, a switch, a router, a bridge, a gateway, etc.). Association request 150 may include any suitable instructions to instruct network orchestrator 100 to configure a network device to associate with one of a plurality of instances of a NMS in the network (e.g., perform at least embedding determination instructions 122, probability score determination instructions 124, instance selection instructions 126, and associating instructions 128).

In examples described herein, the association request 150 may include a query requesting a network address of one of the instances of NMS to associate with the network device. In an example, responsive to powering up of the network device, the network device may be configured to transmit the association request 150 to the network orchestrator 100. A network address of the network orchestrator 100 may be pre-configured in the network device. Based on (e.g., in response to) powering up of the network device, the network device may generate the association request 150 and transmit the association request 150 to the pre-configured network address of the network orchestrator 100. In an instance, the association request 150 may include information relating to resource capability and supported features of the network device. Information relating to resource capability may include information on device type (e.g. model number, part number, serial number, firmware version number, etc.), hardware resource configuration (e.g. size of RAM, storage capacity, processor configuration, etc.). Information relating to supported features may include Quality of Service (QoS), transmission spectrum, data transmission rate, etc.

In examples described herein, a "network management system" or "NMS" refers to processes, applications, or a combination thereof that manage a network's individual components, such as network devices, users, and applications running on the network. An NMS may be used to monitor both software and hardware components in a network. Moreover, an NMS may gather network operating information from various nodes of one or more networks, including network traffic load information, network topology information, network usage information, etc. Furthermore, NMS may transmit commands to various nodes of the one or more networks to alter network topology and routing to achieve various network efficiency and efficacy goals. Moreover, an NMS may perform network management functions including network monitoring, device detection, performance analysis, fault management, configuration management, accounting management, security management, or a combination thereof. Some of the network management functions may be real-time. In addition, an NMS may manage wired and wireless infrastructures and provide visibility into network devices, users, and applications running on the network. Furthermore, an NMS may provide a centralized and intuitive user interface for real-time monitoring, proactive alerts, historical reporting, fast and efficient troubleshooting, or a combination thereof. Also, an NMS may provide health and analytics information to monitor critical applications and services, including network health corresponding to client usage, monitoring and configuration compliance, alert summaries and other selected statistics, traffic analysis corresponding to application usage and policy enforcement across the network, tracking web categories, client destinations and relative trust levels. Unified Communication and Collaboration (UCC) analytics, or a combination thereof. In some examples, an NMS may be available either on pre-configured hardware appliances or may be deployed in virtual machines (VMs) running on server blades or on any other suitable hardware platform.

In some examples, NMS may comprise a controller. The controller may be configured to manage a plurality of network devices (e.g., servers, switches, routers, access points, etc.) connected to a network. The controller may be an SDN controller. Moreover, the controller may comprise one or more cloud-based resources.

In examples described herein, an "instance" refers to a running (i.e. executing) process originating from a computer program (i.e. a collection of instructions that can be executed by a processing resource to perform a specific task). In other words, each executing process in an Operating System (OS) may be referred to as an instance of some program which it has been instantiated from. Each time a program runs, an instance of that program is executed. Multiple instances of an NMS may be running in the network. In some examples, each instance of the NMS may be deployed on a dedicated pre-configured hardware device. In some examples, each instance of the NMS may be deployed in separate VMs in a VM cluster distributed across physical hosts.

In the example of FIG. 1, network orchestrator 100 may be configured (e.g., encoded with instructions executable by at least one processor 110) to receive a registration request 160 via network registration path 170 to register an instance of an NMS with the network orchestrator 100. Network registration path 170 may include any suitable communication link 172 (e.g., wired or wireless, direct or indirect, etc.) between network orchestrator 100 and a network.

In examples described herein, a "network registration path" may include a combination of hardware (e.g., communications interfaces, communication links, etc.) and instructions (e.g., executable by a processor) to communicate (e.g., receive, send, etc.) a command (e.g., registration request 160) with an external resource (server, cloud resource, etc.) connected to the network.

The registration request 160 may originate from one or more of a plurality of instances of the NMS. The registration request 160 may originate from each instance of the NMS during initial set up of the instance in the network. In examples described herein, the registration request 160 may initiate a hand-shake process between an instance of the NMS and network orchestrator 100. As part of the registration request message payload, the instance of the NMS may convey resource capability (such as hardware resource configuration, e.g., Random Access Memory (RAM) size, storage capacity & configuration, Central Processing Unit (CPU) configuration, number of physical nodes, etc. associated with the instance of the NMS) and supported features, such as the NMS feature-set including details of features available on the instance of the NMS, e.g., Aruba® UCC Dashboard Aggregated Display, Aruba® NetInsight, etc., supported device types indicated by part nos. and model nos. of network devices, count of license subscriptions available on the NMS instance for different features, device limits specifying the maximum number of network devices the instance of the NMS can manage, or a combination thereof. Network orchestrator 100 may store these details received with the payload of the registration request 160.

In the example of FIG. 1, embedding determination instructions 122, when executed by processor 110, may determine a set of embeddings 130 indicative of characteristics of the network device and each of a plurality of instances of the NMS. In examples described herein, "embeddings" refer to learned low-dimensional continuous vector representations of discrete variables. An embedding can translate high-dimensional vectors to a relatively low-dimensional embedding space. Embeddings enable mapping of similar values of discrete variables close to each other in an embedding space and consequently reveal the intrinsic properties of the variables. An embedding may capture some of the semantics of the input by placing semantically similar inputs close together in the embedding space. For example, in the context of word embeddings, "car" is semantically similar to "bus" and may be mapped close to each other in the embedding space. Likewise, a network device of "type A" may be semantically similar to a network device of "type B" and may be mapped close to each other in the embedding space. In an instance, the embeddings may be "entity embeddings" of categorical variables. For example, presence or absence of feature-sets/tools, such as Aruba® UCC Dashboard Aggregated Display, Aruba® NetInsight, etc., may be expressed through "entity embedding" values represented in the embedding space. The embeddings may be obtained from an embedding generation layer (i.e. a hidden layer) of a trained Artificial Neural Network (ANN). The embeddings may be obtained from categorical variables using a dimensionality reduction technique, a collaborative filtering technique, a knowledge-based recommendation technique, natural language processing, or a combination thereof.

Characteristics indicated by the embeddings 130 include resource capability and supported features of each of the plurality of instances and the network device, information on performance history of interaction between each of the plurality of instances and corresponding network devices, and customer requirements. For instance, the embeddings 130 may be determined using information on resource capability and supported features of the network device received by the network orchestrator 100 with the network association request 150 and information on resource capability and supported features of each of the plurality of instances of the NMS received with the registration request.

In the example of FIG. 1, probability score determination instructions 124, when executed by processor 110, may determine, based on the set of embeddings, a probability score 132 for each of the plurality of instances. The probability score 132 for an instance of the plurality of instances is indicative of a likelihood of the network device to be associated with the instance. Thus, an instance of the NMS having a higher probability score has a priority to associate with the network device over another instance of the NMS having a lower probability score. The embeddings 130 may be processed in an ANN to obtain the probability score.

In the example of FIG. 1, instance selection instructions 126, when executed by the processor 110, may select an instance of the NMS to associate with the network device based on the probability score of the instance. In an example, the instance with the highest probability score may be selected to associate with the network device. The selected instance 134 may be one of the instances of the NMS deployed in the network. In an instance, the selected instance may be referred to as a first instance.

In the example of FIG. 1, associating instructions 128, when executed by the processor 110, may configure the network device to associate with the selected instance 134. The associating instructions 128, may include instructions to transmit a network address of the selected instance 134 to the network device. The network address of the selected instance 134 may be obtained from the registration request initially received from the instance. The network address includes an identifier for the selected instance of the NMS on a telecommunications network. In an example, the network address may be a Uniform Resource Locator (URL) of the selected instance. In the example of FIG. 1, the associating instructions 128 may include instructions to configure the network device to communicate with the selected instance 134 using the network address and to include the network device in a list of managed devices of the selected instance. In the example of FIG. 1, associating instructions 128, when executed by the processor 110, may send instructions to configure the network device to enroll itself in the list of managed devices of the selected instance 134. In the example of FIG. 1, network orchestrator 100 may be configured (e.g., encoded with instructions executable by processor 110) to send (e.g., transmit) association configuration 180 via network association path 140 to configure the network device to associate with the selected instance.

In this manner, the network device is associated with a selected instance of the NMS according to probability scores based on characteristics of the network device and the plurality of instances and without manual intervention from the network administrator. Accordingly, errors that could otherwise originate from manual evaluation of the network may be reduced or eliminated.

Figure 2:
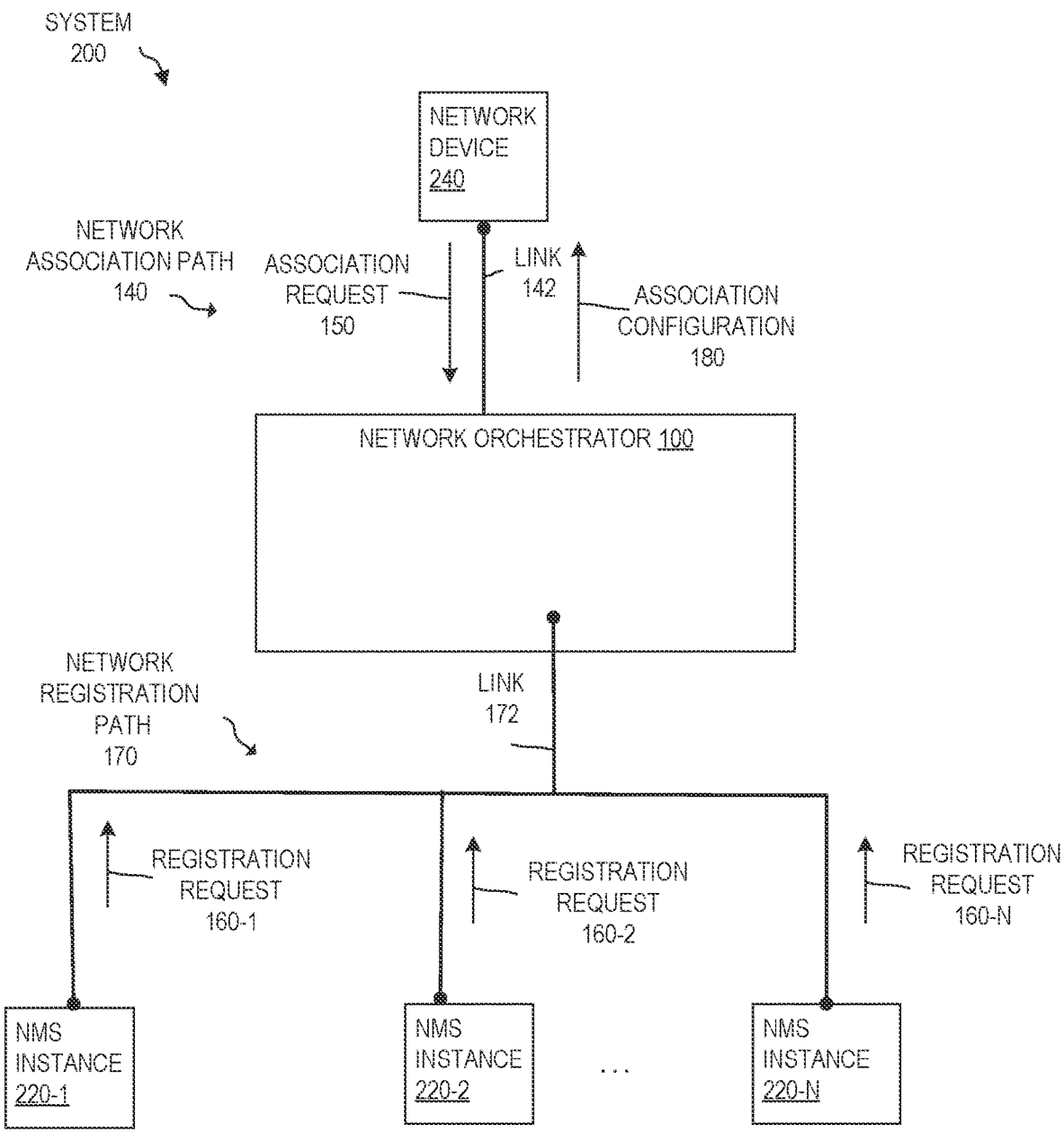
FIG. 2 is a block diagram of an example system for associating a network device to a network management system.

FIG. 2 is a block diagram of an example system 200 for associating a network device to a network management system. System 200 may include network orchestrator 100, as described above in relation to FIG. 1. In the example of FIG. 2, system 200 may comprise a network (not shown), wherein network orchestrator 100 is implemented in the NMS and/or NMS instances. In an example, the network orchestrator 100 may be implemented on dedicated preconfigured hardware devices or in VMs in a VM cluster distributed across physical hosts deployed in the network. In another example, the network orchestrator 100 may be deployed in cloud-based resources in the network.

In some examples, the network is a software defined network (SDN). The network may comprise one or more LANs, VLANs, WLANs, virtual private networks (VPNs), WANs, the Internet, or the like, or a combination thereof. As used herein, a "wide area network" or "WAN" may comprise, for example, a wired WAN, wireless WAN, hybrid WAN, software-defined WAN (SD-WAN), or a combination thereof. Moreover, the network may comprise one or more cellular networks using one or more mobile communications standards (e.g., 3G, 4G, 5G, etc.). It will be understood by one skilled in the art that system 200 may comprise any suitable type(s) of network(s), now known or later developed.

In the example of FIG. 2, system 200 may comprise a plurality of instances 220-1 to 220-N of NMS connected to network orchestrator 100. Each of the instances 220-1 to 220-N may represent an executing entity of the NMS and may be implemented in a dedicated hardware appliance.

In the example of FIG. 2, system 200 may comprise a network device 240 connected to the network orchestrator 100. The network device 240 may comprise a switch or a WAP, a gateway, a bridge, or a router which supports data link layer switching (i.e., Layer 2 switching), IP layer routing (i.e., Layer 3 routing), or a combination thereof. Moreover, the network device 240 may comprise stackable or standalone type switches, power over Ethernet (PoE) or non-PoE type switches, modular or fixed configuration (i.e. fixed configuration Ethernet) type switches, etc. The network device 240 may be attempting to associate (i.e. register itself) with one of the plurality of instances 220-1 to 220-N of the NMS. It may be understood by one skill in the art that the network device may be any suitable type(s) of access points, switches, gateways, routers, bridges, etc., now known or later developed.

In the example of FIG. 2, the network orchestrator 100 receives a registration request from each of the instances 220-1 to 220-N of the NMS. Thus, registration requests 160-1, 160-2, . . . , 160-N is received by the network orchestrator 100 through the network registration path 170 via link 172. The registration requests 160-1 to 160-N originate from each of the instances 220-1 to 220-N of the NMS. The registration request 160-1 include resource capability information (such as hardware resource configuration, e.g., RAM size, storage capacity & configuration, CPU configuration, number of physical nodes, etc. associated with the instance 220-1 of the NMS) and supported features information, such as NMS feature-set including details of features available on the instance of the NMS, supported device types indicated by part nos. and model nos. of network devices, count of license subscriptions available on the instance 220-1 for different features, device limits specifying the maximum number of network devices the instance 220-1 can manage. Likewise, registration requests 160-2 to 160-N include resource capability information and supported features information for each of the instances 220-2 to 220-N of the NMS, respectively. The information relating to resource capability and supported features of the instances 220-1 to 220-N of the NMS may be included as a payload to each of the registration requests 160-1 to 160-N.

In the example of FIG. 2, network orchestrator 100 receives an association request 150 from the network device 240 via link 142. The association request 150 may include a query from the network device 240 requesting a network address of one of the instances 220-1 to 220-N of the NMS to associate with the network device 240. In an instance, the association request 150 may include information relating to resource capability and supported features of the network device 240. Information relating to resource capability may include information of device type (e.g. model number, part number, serial number, firmware version number, etc.), hardware resource configuration (e.g. size of RAM, storage capacity, processor configuration, etc.). Information relating to supported features may include Quality of Service (QoS), transmission spectrum, data transmission rate, etc. The information relating to resource capability and supported features of the network device 240 may be included as a payload of the association request 150.

In the example of FIG. 2, the network orchestrator 100 may also receive information about the resource capabilities and supported features of the network device 240 through out-of-band communication. In examples described herein, "out-of-band communication" between two entities refers to exchange of data via a frequency band outside a defined/usual frequency band of data exchange between those two entities. Thus, exchange of data between the network orchestrator 100 and the network device 240 over Bluetooth may be considered as out of band communication between them. For instance, the network device 240 may communicate with the network orchestrator 100 using a Bluetooth Low Energy (BLE) beacon. The network orchestrator 100 may be configured (e.g., encoded with instructions executable by at least one processor 110) to receive information relating to a deployment location and deployment intent of the network device 240 based on out-of-band communication from the network device 240. For instance, the deployment location may be identified as one of a lab, an airport, or a marketplace. The location may be indicative of an estimated processing load of the network device. The deployment intent may be pre-defined by a user or a network administrator. The deployment intent of the network device 240 may refer to a specific purpose or use of the network device 240 and may provide an indication of the processing load that the network device may be subjected to. For instance, the deployment intent may be assigned as "General" for network devices deployed for handling of usual traffic of the network, "Temporal" for network devices deployed for a pre-defined time period to handle increased network traffic for the pre-defined time period, "High-Traffic" for network devices specifically deployed to handle surge in network traffic owing to events, such as fairs, conferences, etc., "VIP movement" for network devices to handle network traffic for pre-defined VIP roles, etc. The deployment intent may be defined by a network administrator or user based on the prospective or potential use of the network device which is being deployed. The network administrator may define a "deployment intent" through a predefined input that is received by the NMS/NMS instance.

In the example of FIG. 2, the network orchestrator 100, responsive to receiving the association request 150 may be configured (e.g., encoded with instructions executable by a processor 110) to provide an input to an input layer of an artificial neural network (ANN), wherein the input, also referred to as a first input, includes information on resource capability and supported features of each of the plurality of instances 220-1 to 220-N and the network device 240. The first input may be extracted from the payload of the association request 150 received from the network device 240 and from the payload of the registration requests 160-1 to 160-N received from the instances 220-1 to 220-N of the NMS, respectively. In an instance, the first input may include parameters indicative of resource capability and supported features of the network device 240 and of each of the plurality of instances 220-1 to 220-N of the NMS. For instance, Table 1 below shows the parameters of the first input.

the parameters of the first input also include a "device type embedding" and a "device feature embedding", as shown in Table 1. In examples described herein, a "device type embedding" refers to an embedding derived from device type information, for instance, a model no., part no., serial no. firmware version no., etc. of the network device (e.g., network device 240) attempting to associate with an instance of the NMS. For instance, the device type embedding may be an encoded value representative of the device type information. In examples described herein, a "device feature embedding" refers to an embedding derived from supported feature information, such as, for example, Quality of Service (QoS), transmission spectrum, data transmission rate, etc., of the network device 240. In an instance, the device type information and supported feature information may be included in a payload of the association request 150 received by the network orchestrator 100 from the network device 240. The network orchestrator 100 may extract the device type embedding and device feature embedding by processing the device type information and supported features information, respectively, using a dimensionality reduction technique, such as Principal Component Analysis (PCA) or T-distributed Stochastic Neighbor Embedding (TSNE). The "device type embedding" and "device feature embedding" may be processed in a layer of an ANN using the dimensionality reduction technique.

In the examples described herein, an artificial neural network (ANN) refers to an information processing system comprising interconnected processing elements that are modeled on the structure of a biological neural network. The interconnected processing elements may be referred to as "artificial neurons" or "nodes". The ANN may comprise a plurality of artificial neurons, which may be organized into a plurality of layers. In an instance, the ANN may comprise four layers: an input layer, two hidden layers, viz., a first hidden layer and a second hidden layer, and an output layer. In an instance, the ANN may be a feedforward neural

TABLE 1

| NMS ID | CPU | RAM | RAID | Hard Disk Size | HDD acc. | Max. Rx/Tx | Device type embedding | NMS ID of master | Device feature Embedding |
|---|---|---|---|---|---|---|---|---|---|
| 0 | 80000 | 256 | 1 | 3000 | 1 | 40 | 0.5234 | 5 | 0.3435 |
| 1 | 50000 | 128 | 0 | 3000 | 1 | 20 | 0.5234 | 4 | 0.3435 |
| 2 | 100000 | 512 | 1 | 4000 | 1 | 20 | 0.5234 | 5 | 0.3435 |

As shown in Table 1 above, the parameters of the first input may include details of resource capability and supported features for the instances of the NMS and the network device. Although in Table 1, parameters of the first input corresponding to three instances of NMS are shown, it is noted that parameters of the first input corresponding to more than three or less than three instances of NMS may be provided as the first input. As shown in Table 1, NMS instance with "NMS identification (ID): 0" has an allotted "CPU" capacity of 80,000 milliCPUs, an allotted "RAM" of 256 Gigabytes (GB), "Redundant Array of Independent Disks (RAID)" is set as "1" indicating that RAID support is enabled for this instance, has an allotted "hard disk (HDD) size" of 3000 GB, "HDD acc." set at "1" indicative of presence of hard disk accelerator support, "max. Rx/Tx" indicating maximum number of network devices that may be associated with the particular instance. If the instance of the NMS is deployed in a cluster, the "NMS ID of master" NMS is also captured as a parameter of the first input. In addition, network wherein connections between the units may not form a cycle. In the feedforward neural network, the information may move in one direction, from the input layer, through the hidden layer(s), and to the output layer. There may be no cycles or loops in the network.

In an example, the ANN may be based on a backpropagation architecture. The backpropagation may be used to train the ANN. When an input vector is presented to the ANN, it may be propagated forward through the ANN, layer by layer, until it reaches the output layer. The output of the network may be compared to the desired output, using a loss function, and an error value may be calculated for each of the artificial neurons in the output layer. The error values may be propagated backwards, starting from the output, until each artificial neuron has an associated error value which roughly represents its contribution to the original output. Backpropagation may use these error values to calculate the gradient of the loss function with respect to the weights in the network. This gradient may be provided to an optimization method, which in turn may use it to update the weights to minimize the loss function. As the ANN is trained, the neurons in the intermediate layers may organize themselves in such a way that the different neurons may learn to recognize different characteristics of the total input. After training of an arbitrary input pattern is presented to the ANN, neurons in the hidden layer(s) of the network may respond with an output if the new input contains a pattern that resembles a feature that the individual neurons have learned to recognize during their training.

In an example, the input layer of the ANN may include three artificial neurons, the first hidden layer may include four artificial neurons, the second hidden layer may include two artificial neurons, and the output layer may include one artificial neuron. In some other examples, the input layer may include more or less than three artificial neurons in the input layer, the first hidden layer may include more or less than four artificial neurons, the second hidden layer may include more or less than two artificial neurons, and the output layer may include more than one artificial neuron.

In the examples described herein, the first hidden layer may be an embedding generation layer. The first hidden layer may be initialized with random weights and may learn an embedding for all of the input variables in the training dataset. In some examples, the embedding generation layer may be used as part of other types of ANN models. For instance, the embedding generation layer may be used as part of a Deep Neural Network (DNN) model where the embedding is learned along with the DNN model itself. It can be used to load a pre-trained embedding model, a type of transfer learning. The embedding generation layer may include at least three arguments, i.e., an input dimension representative of the size of the integer encoded values of the input variables, an output dimension representative of the size of the vector space in which the input variables will be embedded (i.e., the size of the output vectors from this layer for each input variable), and input length representative of the length of input sequences.

In the example of FIG. 2, the network orchestrator 100 may process the first input in a hidden layer (i.e., the first hidden layer/embedding generation layer) of the ANN using a dimensionality reduction technique, wherein the hidden layer is coupled to the input layer. For instance, the parameters of the first input, as illustrated in Table 1, are converted to embedding(s) by application of a dimensionality reduction technique, such as PCA, TSNE or any other suitable dimensionality reduction technique. Based on the processing, the network orchestrator 100 may extract an embedding or more than one embedding representative of resource capability and supported features of each of the plurality of instances 220-1 to 220-N and the network device 240. The extracted embedding(s) may be referred to as a first subset of embeddings.

In the example of FIG. 2, the network orchestrator 100 may be configured (e.g. coded with instructions) to update the first input to the first hidden layer based on an update message received from at least one of the plurality of instances 220-1 to 220-N, wherein the update message is indicative of changes in resource capability and supported features in at least one of the plurality of instances. In an example, the update message may include a heartbeat indicator message periodically received from at least one of the plurality of instances 220-1 to 220-N, wherein the heartbeat indicator message includes an NMS instance ready indicator, resource availability indicator(s), and a feature health indicator. The NMS instance ready indicator is representative of an indication that the NMS is up and ready to accept device connections. Resource availability indicator(s) include information regarding current usage and availability of free hardware resources (such as CPU, RAM, Disk size, etc.). The feature health indicator includes information regarding each feature and its current health. For example, UCC can be marked as healthy based on certain characteristics, NetInsight® can be marked as unhealthy if certain applications or features associated with it are down. The network orchestrator 100, may update the parameters of the first input, responsive to receiving updated NMS instance ready indicator, resource availability indicator(s), and feature health indicator along with the heartbeat indicator message.

In another example, the update message may include a status update message from at least one of the plurality of instances 220-1 to 220-N, wherein the status update message includes NMS feature updates, subscription license updates, and device onboarding updates. The NMS feature updates include information of addition/removal/update of the NMS feature-set. The subscription license updates include current statistics of used and free subscription licenses for each of the features/applications provided by the NMS. The device onboarding updates may include list of serial numbers of connected network devices and details like number of connected clients, etc. The network orchestrator 100, may update the parameters of the first input, responsive to receiving NMS feature updates, subscription license updates, and device onboarding updates along with the status update message.

In another example, the update message may include an event update message from at least one of the plurality of instance 220-1 to 220-N, wherein the event update message includes information indicative of at least one of the plurality of instances going offline for maintenance and returning online, hardware upgrades in at least one of the plurality of instances, and a node of at least one of the plurality of NMS instances going offline. The network orchestrator 100, may update the parameters of the first input, responsive to receiving the event update message. Since the parameters of the first input are updated in real-time responsive to receiving the update message, the first subset of embeddings extracted from the parameters of the first input may also be modified in real-time with change in network conditions (such as characteristics of the instances of the NMS and the network device). Thus, dynamic changes in network conditions are accounted for in real-time while selection of an instance of NMS to associate with the network device, consequently enabling better network management.

In the example of FIG. 2, the network orchestrator 100, responsive to receiving the association request 150 may be configured (e.g., encoded with instructions executable by a processor 110) to provide an input, also referred to as a second input, to the input layer of the ANN, wherein the second input includes information on performance history of interaction between each of the plurality of instances 220-1 to 220-N and corresponding network devices. The corresponding network devices refer to network devices which may have identical functionalities as that of the network device 240. The corresponding network devices may have one of a model no., a part no., a serial no., a firmware version no., or a combination thereof, which matches that of the network device 240. For instance, the corresponding network devices may have a hardware configuration/architecture, identical or similar to that of the network device 240. The corresponding network devices may be previously deployed in the network and associated with one of the instances 220-1 to 220-N of the NMS. The performance history of interaction between a predefined number (e.g., ten) of corresponding network devices and one or more of the instances 220-1 to 220-N of the NMS may be considered.

The second input may be extracted from the instances of the NMS deployed in the network. The instances of the NMS may store historical data of previously associated corresponding network devices. In an instance, the second input may include parameters indicative of the performance history of interaction between each of the plurality of instances and the corresponding network devices. For instance, the second input may include parameters in the form of two matrices as shown in "Table 2" and "Table 3".

TABLE 2

| Device ID | Associated NMS instance ID | NMS Down time | Device stats latency | NMS instance issues score | NMS instance performance index |
|---|---|---|---|---|---|
| 1 | 5 | 100 | 23 | 13 | 90 |
| 2 | 4 | 200 | 20 | 15 | 80 |
| 3 | 6 | 150 | 25 | 18 | 75 |

TABLE 3

| NMS instance ID | No. of associated devices | Associated Device encoding | Issue history embedding | Device stats traffic score |
|---|---|---|---|---|
| 4 | 23 | 1010101111 | 0.4442 | 66 |
| 5 | 30 | 1010101011 | 0.5469 | 53 |
| 6 | 20 | 1010101100 | 0.2548 | 48 |

Table 2 shows interaction history of each of a plurality of network devices associated with a particular instance of NMS and performance of the associated instance of NMS. Although in Table 2, parameters of the second input corresponding to three network devices are shown, parameters of the second input corresponding to more than three or less than three network devices may be included in the second input. As shown in Table 2, network device with "device identification (ID): 1" when associated with an instance of NMS having "NMS instance ID: 5", the instance of the NMS remains unavailable for "100 milli seconds" as denoted by "NMS instance downtime" and there is a latency of "23 milliseconds" in forwarding data packets to the network device as denoted by "Device stats latency". In addition, the parameters also include a "NMS instance issues score" and a "NMS instance performance index", as shown in Table 2. In examples described herein, an "NMS instance issues score" refers to an implicit rating calculated by the network orchestrator 100 for the NMS instance on the basis of a number of failures (i.e., issues) occurring in the NMS instance when associated with the corresponding network device. As shown in Table 2, the "NMS instance issues score" is 13 for interaction between "Device ID: 1" when associated with "NMS instance ID: 5". In examples described herein, an "NMS instance performance index" refers to an implicit rating calculated by the network orchestrator 100 for the NMS instance on the basis of an onboarding time of the corresponding network device to associate with the corresponding NMS instance. For instance, with reference to Table 2, the onboarding of a network device having "Device ID: 1" with NMS instance having "NMS instance ID: 5" may be faster as compared to onboarding of a network device having "Device ID: 2" with NMS having "NMS instance ID: 4".

Table 3 depicts parameters indicative of overall performance of each of a plurality of instances of NMS based on its interaction with associated network devices. Although in Table 3, parameters of the second input corresponding to three instances of NMS are shown, parameters of the second input corresponding to more than three or less than three instances of NMS may be included in the second input. As shown in Table 3, NMS instance with "NMS instance ID: 4" is associated with "23" network devices as denoted by "No. of associated devices". In addition, the parameters also include an "associated device encoding", an "issue history embedding", and a "device stats traffic score". The "associated device encoding" may be an encoded value representative of device types of network devices associated with the corresponding instance of NMS. The device type may be represented by a model no., serial no., part no., firmware version no., etc. of the network devices. As shown in Table 3, "associated device encoding" is "1010101111" for NMS instance with "NMS instance ID: 4". For instance, the "associated device encoding" may be determined by the network orchestrator 100 by using a one-hot encoding technique on information of respective device types of network devices associated with an instance of NMS. The "issue history embedding" includes an encoded value representative of failures (issues) occurring in a particular instance of NMS over a predefined time period. In an instance, information relating to occurrence of failure may be obtained by the network orchestrator 100 from an instance of the NMS. The network orchestrator 100 may extract the "issue history embedding" by processing the information relating to occurrence of failure, using a dimensionality reduction technique, such as PCA or TSNE. The information relating to occurrence of failure may be processed in a layer of an ANN using the dimensionality reduction technique.

In examples described herein, a "device stats traffic score" refers to an implicit rating determined by the network orchestrator 100 for the NMS instance on the basis of data packets exchanged/processed by network devices associated with a particular instance of NMS. In addition, the device stats traffic score is indicative of overall performance of network devices associated with a particular instance of the NMS. For instance, as shown in Table 2 the device stats traffic score is 66 for network devices associated with an instance of NMS having "NMS instance ID: 5". In some examples, the device stats traffic score may be determined by the network orchestrator 100 using a ranking/scoring algorithm. Examples of the ranking/scoring algorithms include Alternating Least Squares (ALS) algorithm and PCA.

In the example of FIG. 2, the network orchestrator 100 may process, the second input in a hidden layer (i.e., the first hidden layer/embedding generation layer) of the ANN using a collaborative filtering technique, wherein the hidden layer is coupled to the input layer. For instance, the first matrix and the second matrix, as shown in Tables 2 and 3, respectively, may be provided as the second input to the first hidden layer. The two matrices may be presented as an input to a matrix factorization algorithm, such as Weighted Alternating Least Squares (WALS) algorithm, to perform the collaborative filtering. Based on the processing, the network orchestrator 100 may extract an embedding or more than one embedding representative of performance history of interaction between each of the plurality of instances 220-1 to 220-N and corresponding network devices. The extracted embedding(s) may be referred to as a second subset of embeddings.

In the example of FIG. 2, the network orchestrator 100, responsive to receiving the association request 150 may be configured (e.g., encoded with instructions executable by a processor 110) to provide an input, also referred to as a third input, to the input layer of the ANN, wherein the third input is indicative of characteristics of customer requirements at a deployment site of the network device 240. The third input may be determined by the network orchestrator 100 based on customer responses indicative of customer preferences. In an instance, customer responses relating to the third input may be received by the network orchestrator 100 via a survey requesting the customer requirements. The third input may also include characteristics of the network device 240. For instance, Table 4 below shows parameters which may be included in the third input.

TABLE 4

| Device Location type | Device sentiment score | Customer device order embedding | Customer NMS purchase order embedding |
|---|---|---|---|
| 1 | 0.8 | 0.786 | 0.3 |
| 2 | 0.5 | 0.871 | 0.4 |
| 3 | 0.7 | 0.522 | 0.7 |

Table 4 shows parameters of the third input indicative of characteristics of customer requirements at a site of deployment of the network device 240. Although in Table 4, parameters of the third input corresponding to three "device locations types" are shown, parameters of the third input corresponding to more than three or less than three "device location types" may be included in the third input. In examples described herein, a "device location type" may be a categorical variable indicative of a deployment location of the network device 240. In an example, the network orchestrator 100 may identify a deployment location of the network device 240 based on an out-of-band message communicated from the network device 240. For instance, "device location type: 1" may represent that the network device 240 is deployed in a lab, "device location type: 2" may represent that the network device 240 is deployed in an airport, and "device location type: 3" may represent that the network device 240 is deployed in a marketplace.

In examples described herein, a "device sentiment score" is indicative of performance of corresponding network devices and associated instances of NMS in the deployment site. Corresponding network devices refer to network devices having a similar or identical device type. In an example, two network devices having identical model number or part number or identical firmware version number may be understood to be similar to each other. The network orchestrator 100 may determine the "device sentiment score" based on natural language processing of parameters indicative of processing faults in the corresponding network devices and associated instances of NMS in the deployment site. In an instance, the network orchestrator 100 may analyze performance logs of instances of NMS and/or corresponding network devices by Natural Language Processing and determine the "device sentiment score" representative of number of processes rebooted or failures encountered.

The network orchestrator 100 may obtain customer purchase order history for the corresponding network devices and for each of the plurality of instances of NMS from the customer response to the survey. The customer purchase order history may include information on previous customer orders for network devices and NMS instances at the particular deployment site. In examples described herein, a "customer device purchase order embedding" refers to an embedding derived from information relating to a number of customer orders received for purchase of corresponding network devices for the deployment site. In examples described herein, the "customer NMS purchase order embedding" refers to an embedding derived from information relating to number of customer orders received for purchase of NMS instances for the deployment site. A correlation between a customer device order embedding and a customer NMS purchase order embedding may help in predicting future processing load for NMS instances in the deployment site. The network orchestrator 100 may extract the customer NMS purchase order embedding and the customer device order embedding by processing the customer purchase order history using a dimensionality reduction technique, such as PCA or TSNE in a recurrent neural network (RNN). A RNN refers to a type of ANN which is designed to recognize a data's sequential characteristics and use patterns to predict the next likely scenario. RNNs are a class of feedforward neural networks which can use their internal state (i.e., memory) to process variable length sequences of inputs.

In the example of FIG. 2, the network orchestrator 100 may process, the third input in a hidden layer (i.e., the first hidden layer/embedding generation layer) of the ANN using a knowledge-based recommendation technique, wherein the hidden layer is coupled to the input layer. In an instance, the network orchestrator 100 may process the device sentiment score, the customer device order embedding, and the customer NMS purchase order embedding in a knowledge-based recommender system. Based on the processing, the network orchestrator 100 may extract an embedding or more than one embedding representative of characteristics of customer requirements at the deployment site of the network device 240. The extracted embedding(s) may be referred to as a third subset of embeddings.

In the example of FIG. 2, the network orchestrator 100 may determine the set of embeddings indicative of characteristics of the network device 240 and each of a plurality of instances 220-1 to 220-N of the NMS based on (i.e. in response to) the first subset of embeddings, the second subset of embeddings, and the third subset of embeddings. In an instance, the network orchestrator 100 may determine the set of embeddings to include at least one of the first subset of embeddings, the second subset of embeddings, the third subset of embeddings, and a combination thereof.

In the example of FIG. 2, the network orchestrator 100 may identify deployment density of corresponding network devices in a deployment site of the network device 240. Corresponding network devices refer to network devices having an identical or similar device type (e.g. model no., serial no., version no., etc.) as that of the network device 240. In examples described herein, "deployment density" refers to a measure of a number of network devices deployed in a coverage area. For instance, based on the information relating to deployment location of network devices in the deployment site retrieved from an out-of-band communication from network devices, the network orchestrator 100 may identify the deployment density. In some examples, the deployment density may be represented as one hot encoding and may impact the selection of instance of NMS to associate with the network device 240. In the example of FIG. 2, the network orchestrator 100 may determine a "predictive client count" based on status and configuration information of the corresponding network devices previously associated with each of the plurality of instances 220-1 to 220-N in the deployment site. In examples described herein, a "predictive client count" may be indicative of number of clients connected with corresponding network devices associated with respective instances of NMS. Thus, the predictive client count may provide an estimate of a number of new clients that may associate with the network device and consequently provide an indication of a potential processing load on the corresponding network devices and associated instances of NMS. The status and configuration information of corresponding network devices associated with an instance of NMS includes information on number of running applications, number of connected client devices, data download/upload speed, number of active processes, etc. in each of the corresponding network devices. In the example of FIG. 2, the network orchestrator 100 may identify, based on the out-of-band message, a deployment intent for which the network device 240 is expected to operate. For instance, the network orchestrator 100 may identify the deployment intent based on receipt of an out-of-band communication (as described above). In examples described herein, "development intent" may refer to a specific purpose or use of the network device 240 and may provide an indication of the processing load that the network device may be subjected to. For instance, the deployment intent may be defined as "General" for network devices deployed for handling of usual traffic of the network. "Temporal" for network devices deployed for a pre-defined time period to handle increased network traffic for the pre-defined time period, "High-Traffic" for network devices specifically deployed to handle surge in network traffic owing to events, such as fairs, conferences, VIP movement etc.

In the example of FIG. 2, the network orchestrator 100 may provide an input to a hidden layer (such as the second hidden layer) of the ANN, wherein the input includes the deployment density, the predictive client count, and the deployment intent, wherein the hidden layer is coupled to the output layer of the ANN. For instance, the network orchestrator 100 may provide the parameters of deployment density, the predictive client count, and the deployment intent, as an input to an artificial neuron of the second hidden layer of the ANN. The network orchestrator 100 may also provide the set of embeddings generated from the first hidden layer as an input to another artificial neuron of the second hidden layer. In other words, the parameters (i.e., the "deployment density", the "predictive client count", and the "deployment intent") and the set of embeddings may be provided as an input to the second hidden layer of the ANN. Thus, the ANN may comprise a hybrid model to combine the outcomes of previous models (i.e., the set of embeddings from the first hidden layer) as input to a second hidden layer, where the parameters of deployment density, the predictive client count, and the deployment intent are provided as direct inputs to the second hidden layer.

In some examples, a relative weight or importance may be assigned to each parameter and/or embeddings provided as part of the input to the second hidden layer of the ANN. Table 5 below illustrates an example of relative weights (1, 2, 3, and 4) assigned to parameters and/or embeddings provided as input to the second hidden layer.

TABLE 5

| Parameter/Embedding | Relative weights (descending order) |
|---|---|
| Deployment density | 4 |
| Predictive client count | 3 |

TABLE 5-continued

| Parameter/Embedding | Relative weights (descending order) |
|---|---|
| Deployment intent | 2 |
| Set of embeddings | 1 |

In response to receipt of the parameters and/or embeddings (and associated weights, if assigned) as input, artificial neurons in the second hidden layer which may be coupled to the output layer, may process the parameters and/or embeddings, for example, by using an activation function. The activation function of a node may define the output of that node given an input or set of inputs. An activation function may be considered as a decision making function that determines presence of a particular feature. For example, the activation function may be used by an artificial neuron in the second hidden layer to decide what the activation value of the unit may be based on a given set of input values received from the previous layer, i.e., the first hidden layer. The activation value of many such units may then be used to make a decision based on the input. In an instance, the activation function may be one of a normalized exponential function and a weighted logistic regression function. Thus, the network orchestrator 100 may process the input to the second hidden layer using one of the normalized exponential function and the weighted logistic regression function.

Once the input parameters and/or embeddings (and associated weights, if any) are processed by the second hidden layer, the artificial neuron in the output layer, which may be coupled to the second hidden layer of the ANN, may provide an output. In an example, the output may include a probability score for each of the plurality of instances 220-1 to 220-N of the NMS. Thus, based on the processing of the embeddings and/or parameters in the second hidden layer, the network orchestrator 100 extracts the probability score for each of the plurality of instances 220-1 to 220-N. Each instance may be assigned a probability score by the network orchestrator 100. The probability score may be assigned using a numeral (for example, 1, 2, 3, 4, and 5) or a non-numeral value (for example, High, Medium, and Low, which may represent relative values). In an example, the network orchestrator 100 may select an instance (e.g., instance 220-1) of the plurality of instances 220-1 to 220-N to associate with the network device 240, based on the respective probability scores of the instances. In an example, the instance 220-1, also referred as a first instance, may have the highest probability score among the plurality of instances. In another example, the network orchestrator 100 may identify an instance of NMS having a relatively higher probability score to associate with the network device 240.

In the example of FIG. 2, the network orchestrator 100 may associate the network device 240 to the selected first instance 220-1. In an instance, the associating instructions 128, may be executed to associate the network device 240 with the first instance 220-1. The associating instructions 128 may include instructions to transmit a network address of the first instance 220-1 to the network device 240. The network address of the first instance 220-1 may be obtained from the registration request 160-1 initially received by the network orchestrator 100 from the instance 220-1. In the example of FIG. 2, the network orchestrator 100 may configure the network device 240 to communicate with the first instance 220-1 using the network address and to include the network device 240 in a list of managed devices of the selected first instance 220-1. In the example of FIG. 2, associating instructions 128, when executed by the processor 110, may send instructions to configure the network device 240 to enroll itself in the list of managed devices of the selected first instance 220-1. In the example of FIG. 2, network orchestrator 100 may be configured (e.g., encoded with instructions executable by processor 110) to send (e.g., transmit) association configuration 180 via network association path 140 to configure the network device 240 to associate with the first instance 220-1.

In the example of FIG. 2, the network orchestrator 100, based on the probability score of each of the plurality of instances 220-1 to 220-N, may identify a second instance, say 220-2, of the plurality of instances to associate with the network device 240, wherein the second instance 220-2 has a probability score lower that a probability score of the first instance 220-1. In an example, the second instance 220-2 has a probability score relatively lower than the first instance 220-1 and relatively higher than respective probability scores of remaining of the plurality of instances 220-3 to 220-N. The network orchestrator 100 is configured to associate the network device 240 to the second instance 220-2, in response to a failure in the first instance 220-1. Failure may occur in the first instance 220-1 when the first instance goes down or is otherwise unavailable. In an instance, the associating instructions 128 may include instructions to transmit a network address of the second instance 220-2 to the network device 240. The network address of the second instance 220-2 may be obtained from the registration request 160-2 initially received by the network orchestrator 100 from the second instance 220-2.

In the example of FIG. 2, before the ANN may be used to determine a probability score for each of the plurality of instances 220-1 to 220-N, the ANN may be calibrated in a learning or training phase. In the training phase, the input parameters (i.e., deployment density, predictive client count, and deployment intent) and/or embeddings indicative of characteristics of the network device 240 and each of a plurality of instances 220-1 to 220-N of the NMS may be routed via the network orchestrator 100 for a pre-defined time interval. For instance, the pre-defined time interval may range from a few minutes to hours. In another example, the calibration may occur outside of network orchestrator 100, for example, via a background process fed by input parameters and/or embeddings captured in real time at each of the plurality of instances 220-1 to 220-N of NMS and at the corresponding network devices associated with respective instances. The predefined time interval may be user-defined or system-defined. During the predefined time interval, the network orchestrator 100 may determine the set of embeddings in relation to various parameters for each of the plurality of instances of NMS and corresponding network devices. These parameters and embeddings may be similar to those mentioned earlier in Tables 1 to 4. The data collected during the predefined time interval may be provided as input data to the second hidden layer of the ANN.

Table 6 below illustrates four samples of parameters and/or embeddings provided as input to the second hidden layer of the ANN for each of five instances of NMS.

TABLE 6

| NMS instance | Deployment density | Predictive client count | Intent of deployment | Embedding | Probability score |
|---|---|---|---|---|---|
| 220-1 | 11011110 | 20 | General | 0.8985 | 0.9018 |
| 220-2 | 11010011 | 25 | Temporal | 0.8095 | 0.7865 |
| 220-3 | 11011011 | 22 | High traffic | 0.3459 | 0.1145 |
| 220-4 | 11010000 | 23 | Temporal | 0.3455 | 0.3456 |
| 220-5 | 11010001 | 30 | Temporal | 0.6785 | 0.4546 |

In response to receipt of the input parameters and/or embeddings (and associated weights, if assigned), the network orchestrator 100 may process the parameters and embeddings in the second hidden layer of the ANN, for example, by using an activation function. Once the input parameters (and associated weights, if any) are processed, the network orchestrator 100 may select an instance to associate with the network device based on the probability score. In an example, the output layer of the ANN may enable selection of the instance to associate with the network device based on the probability score The learning (or training) phase of the ANN may be an iterative process in which the parameters ("deployment density", "predictive client count", "deployment intent") and the embeddings may be presented by the network orchestrator 100 one at a time to the ANN, and any weights associated with the input values may be adjusted each time. After all samples are presented, the process may be repeated again until it reaches the desired error level. The initial weights may be set to any values, for example the initial weights may be chosen randomly. The network orchestrator 100 may configure the ANN to process the training samples one at a time using weights and functions in the second hidden layer, and then compare the resulting output against a desired output. The ANN may use back propagation to measure the margin of error and adjust weights, before the next sample is processed. Once the ANN is trained or calibrated using the samples with acceptable margin of error, the ANN may be used by the network orchestrator 100 to determine the probability score, as explained earlier.

Figure 3:
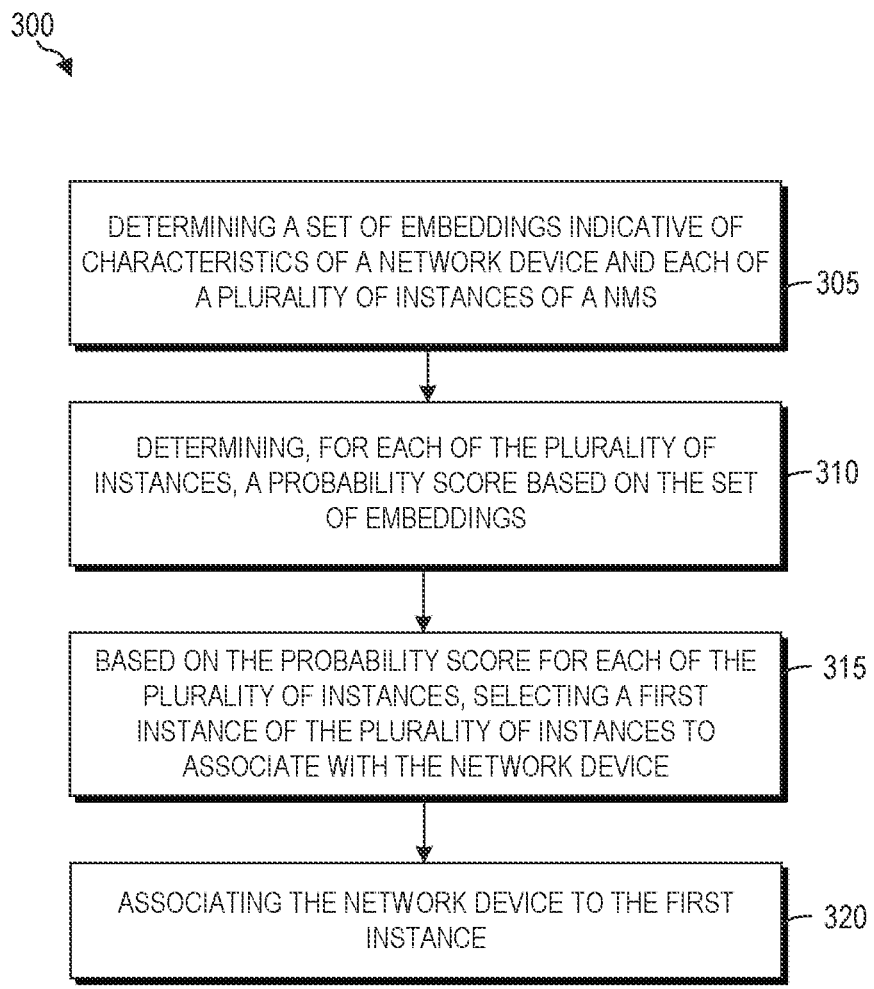
FIG. 3 shows an example functionality for associating a network device to a network management system

FIG. 3 shows an example functionality 300 for associating a network device to a network management system. Functionality 300 may be implemented as a method or may be executed as one or more instructions on a machine (e.g., by at least one processor), where the one or more instructions are included on at least one machine-readable storage medium (e.g., a non-transitory machine readable-storage medium.) While only four blocks are shown in functionality 300, functionality 300 may include other actions described herein. Additionally, although the blocks are shown in an order, blocks depicted in FIG. 3 may be performed in any order and at any time. Also, some of the blocks shown in functionality 300 may be omitted without departing from the spirit and scope of this disclosure. Functionality 300 may be implemented on a network orchestrator according to any of the examples herein.

The functionality 300 may include receiving, by the network device, an association request from the network device attempting to associate with one of the instances of NMS. The association request may include a query from the network device requesting a network address of one of the instances of the NMS to associate with the network device.

For instance, the association request may include information relating to resource capability and supported features of the network device. Information relating to resource capability may include device type information (e.g. model number, part number, version number, etc.), hardware resource configuration (e.g. size of RAM, storage capacity, processor configuration, etc.). Information relating to supported features may include Quality of Service (QoS), transmission spectrum, data transmission rate, etc. The information relating to resource capability and supported features of the network device may be included as a payload of the association request.

The functionality 300 may include receiving, by the network orchestrator information about the resource capabilities and supported features of the network device via out-of-band communication. For instance, the network device may communicate with the network orchestrator using a Bluetooth Low Energy (BLE) beacon. The functionality 300 may include receiving, by the network orchestrator, information relating to location of deployment and intent of deployment of the network device based on out-of-band communication from the network device. For instance, the location of deployment may be identified as one of a lab, an airport, or a market. The location may be indicative of a processing load of the network device. The intent of deployment information may be pre-defined by a user or a network administrator. The intent of deployment of the network device may refer to a specific purpose or use of the network device and may provide an indication of the processing load that the network device may be subjected to. Intent of deployment may be defined as "General" for network devices deployed for handling of usual traffic of the network, "Temporal" for network devices deployed for a pre-defined time period to handle increased network traffic for the pre-defined time period, "High-Traffic" for network devices specifically deployed to handle surge in network traffic owing to events, such as fairs, conferences, etc., "VIP movement" for network devices to handle network traffic for pre-defined VIP roles, etc.

As shown in block 305, functionality 300 includes determining, by the network orchestrator, a set of embeddings indicative of characteristics of the network device and each of a plurality of instances of the NMS. Characteristics indicated by the embeddings include resource capability and supported features of each of the plurality of instances and the network device, information on performance history of interaction between each of the plurality of instances and corresponding network devices, and customer requirements. For instance, the embeddings may be determined using information on resource capability and supported features of the network device received by the network orchestrator with the network association request and information on resource capability and supported features of each of the plurality of instances of the NMS received with the registration request.

The functionality 300 may include providing, by the network orchestrator, an input to an input layer of an artificial neural network (ANN), wherein the input, also referred to as a first input, includes information on resource capability and supported features of each of the plurality of instances and the network device. The first input may be extracted from the payload of the association request received from the network device and from the payload of the registration requests received from respective instances of the NMS. For instance, the first input may include parameters indicative of resource capability and supported features of the network device and of each of the plurality of instances of the NMS. For instance, for a particular NMS instance, the parameters may include an allotted "CPU" capacity, an allotted "RAM", availability of "Redundant Array of Independent Disks (RAID)" support, "hard disk (HDD) size", "HDD accelerator support", etc. If the instance of the NMS is deployed in a swarm or cluster, the "NMS ID of the master" NMS is also captured as a parameter of the first input. In addition, the parameters of the first input also include a "device type embedding" and a "device feature embedding". The network orchestrator may extract the "device type embedding" and "device feature embedding" by processing the device type information and supported features information, respectively, using a dimensionality reduction technique, such as PCA or TSNE. The "device type embedding" and "device feature embedding" may be processed in a layer of an ANN using the dimensionality reduction technique.

The functionality 300 may include processing by the network orchestrator, the first input in a hidden layer (i.e. the first hidden layer/embedding generation layer) of the ANN using a dimensionality reduction technique, wherein the hidden layer is coupled to the input layer. In an instance, the parameters of the first input, are converted to embedding(s) by application of a dimensionality reduction technique, such as PCA, TSNE or any other suitable dimensionality reduction technique. The functionality 300 may include, based on the processing, extracting, by the network orchestrator, an embedding or more than one embedding representative of resource capability and supported features of each of the plurality of instances and the network device. The extracted embedding(s) may be referred to as a first subset of embeddings.

The functionality 300 includes updating, by the network orchestrator, the input (i.e., the first input) based on an update message received from at least one of the plurality of instances, wherein the update message is indicative of changes in resource capability and supported features in at least one of the plurality of instances.

The functionality further includes providing, by the network orchestrator, an input, also referred to as a second input, to the input layer of the ANN, wherein the second input includes information on performance history of interaction between each of the plurality of instances and corresponding network devices. The corresponding network devices refer to network devices which may have identical or similar functionalities as that of the network device 240. The corresponding network devices may have one of a model no., a part no., a serial no., a firmware version no., or a combination thereof, similar or identical to that of the network device 240. In an instance, the corresponding network devices may have a hardware configuration/architecture, identical or similar to that of the network device 240. The corresponding network devices may be previously deployed in the network and associated with one of the instances of the NMS. The performance history of interaction between a predefined number (say ten) of corresponding network devices and one or more of the instances of NMS may be considered.

The network orchestrator may extract the second input from the instances of the NMS deployed in the network. The instances of the NMS may store historical data of previously associated corresponding network devices. For instance, the second input may include parameters indicative of the performance history of interaction between each of the plurality of instances and the corresponding network devices. For instance, the second input may include two matrices of parameters, viz. a first matrix and a second matrix. The first matrix includes parameters of interaction history of each of a plurality of network devices associated with a particular instance of NMS and performance of the associated instance of NMS. The first matrix of parameters may correspond to a "device identification (ID)" associated with an instance of NMS having a particular "NMS instance ID. The first matrix of parameters include "NMS instance downtime", "Device stats latency", "NMS instance issues score", and a "NMS instance performance index".

The second matrix includes parameters indicative of overall performance of each of a plurality of instances of NMS based on its interaction with associated network devices. The second matrix includes parameters corresponding to a particular "NMS instance ID". The parameters of the second matrix include a "No. of devices", "associated device encoding", an "issue history embedding", and a "device stats traffic score". The "associated device encoding" may be an encoded value representative of device types of network devices associated with the corresponding instance of NMS. The device type may be represented by a model no., serial no., part no., firmware version no., etc. of the network devices. The "issue history embedding" includes an encoded value representative of failures (issues) occurred in a particular instance of NMS over a predefined time period. In an instance, information relating to occurrence of failure may be obtained by the network orchestrator 100 from an instance of the NMS. The network orchestrator 100 may extract the "issue history embedding" by processing the information relating to occurrence of failure, using a dimensionality reduction technique, such as PCA or TSNE. The information relating to occurrence of failure may be processed in a layer of an ANN using the dimensionality reduction technique. The "device stats traffic score" may be determined by the network orchestrator 100 using a ranking/scoring algorithm.

The functionality 300 may include processing, by the network orchestrator, the second input in a hidden layer (i.e. the first hidden layer/embedding generation layer) of the ANN using a collaborative filtering technique, wherein the hidden layer is coupled to the input layer. In an instance, the first matrix and the second matrix, may be provided as the second input to the first hidden layer. The two matrices may be presented as an input to a matrix factorization algorithm, such as Weighted alternating Least Squares (WALS) algorithm, to perform the collaborative filtering. Based on the processing, the network orchestrator 100 may extract an embedding or more than one embedding representative of performance history of interaction between each of the plurality of instances and corresponding network devices. The extracted embedding(s) may be referred to as a second subset of embeddings.

The functionality 300 may include providing, by the network orchestrator, an input, also referred to as a third input, to the input layer of the ANN, wherein the third input is indicative of characteristics of customer requirements at a deployment site of the network device. The third input may be determined by the network orchestrator based on customer responses indicative of customer preferences. In an instance, customer responses relating to the third input may be received by the network orchestrator via a survey requesting the customer requirements. The third input may also include characteristics of the network device. The parameters of the third input indicative of characteristics of customer requirements at a site of deployment of the network device include "device location type", "device sentiment score", "Customer device order embedding", and "Customer NMS purchase order embedding". The network orchestrator may determine the "device sentiment score" based on natural language processing of parameters indicative of processing faults in the corresponding network devices and associated instances of NMS in the deployment site. For instance, the network orchestrator may analyse performance logs of instances of NMS and/or corresponding network devices by Natural Language Processing and determine the "device sentiment score" representative of number of processes rebooted or failures encountered. The network orchestrator 100 may obtain customer purchase order history for the corresponding network devices and for each of the plurality of instances of NMS from the customer response to the survey. The customer purchase order history may include information on previous customer orders for network devices and NMS instances for the particular deployment site. A correlation between "Customer device order embedding" and the "Customer NMS purchase order embedding" may help in predicting future processing load for NMS instances in the deployment site. The network orchestrator 100 may extract the "Customer NMS purchase order embedding" and "Customer device order embedding" by processing the customer purchase order history using a dimensionality reduction technique, such as PCA or TSNE in a recurrent neural network (RNN). A RNN refers to a type of ANN which is designed to recognize a data's sequential characteristics and use patterns to predict the next likely scenario. RNNs are a class of feedforward neural networks which can use their internal state (memory) to process variable length sequences of inputs.

The functionality 300 may include processing, by the network orchestrator, the second input in a hidden layer (i.e., the first hidden layer/embedding generation layer) of the ANN using a knowledge-based recommendation technique, wherein the hidden layer is coupled to the input layer. In an instance, the network orchestrator 100 may process the "device sentiment score", the "customer device order embedding", and the "customer NMS purchase order embedding" in a knowledge-based recommender system. Based on the processing, the functionality 300 may include extracting, by the network orchestrator, an embedding or more than one embedding representative of characteristics of customer requirements at the deployment site of the network device. The extracted embedding(s) may be referred to as a third subset of embeddings.

Thus, the functionality 300 may include determining, by the network orchestrator, the set of embeddings indicative of characteristics of the network device and each of a plurality of instances of NMS using the first subset of embeddings, the second subset of embeddings, and the third subset of embeddings. For instance, the network orchestrator 100 may determine the set of embeddings to include at least one of the first subset of embeddings, the second subset of embeddings, the third subset of embeddings, and a combination thereof.

The functionality 300 may include, identifying, by the network orchestrator, a deployment density of corresponding network devices in a deployment site of the network device. For instance, based on the information relating to location of deployment of network devices in the deployment site retrieved from an out-of-band communication from network devices, the network orchestrator may identify the deployment density. The deployment density may be represented as one hot encoding and may impact the selection of instance of NMS to associate with the network device 240. The functionality 300 may include, determining, by the network orchestrator a predictive client count based on status and configuration information of the corresponding network devices previously associated with each of the plurality of instances in the deployment site. Thus, the predictive client count may provide an estimate of a number of new clients that may associate with the network device and consequently provide an indication of a potential processing load on the corresponding network devices and associated instances of NMS. The status and configuration information of corresponding network devices associated with an instance of NMS includes information on number of running applications, number of connected client devices, data download/upload speed, number of active processes, etc. in each of the corresponding network devices. The functionality 300 may include identifying, by the network orchestrator, based on the out-of-band message, a deployment intent for which the network device is expected to operate. In an instance, the network orchestrator may identify the deployment intent based on receipt of an out-of-band communication, as described earlier. Intent of deployment may be defined as "General" for network devices deployed for handling of usual traffic of the network, "Temporal" for network devices deployed for a pre-defined time period to handle increased network traffic for the pre-defined time period, "High-Traffic" for network devices specifically deployed to handle surge in network traffic owing to events, such as fairs, conferences, VIP movement etc.

As shown in block 310, the functionality 300 includes determining, by the network orchestrator for each of the plurality of instances, a probability score based on the set of embeddings, wherein the probability score for an instance of the plurality of instances is indicative of a likelihood of the network device to be associated with the instance. The functionality 300 may include providing, by the network orchestrator, an input to a hidden layer (such as the second hidden layer) of the ANN, wherein the input includes the deployment density, the predictive client count, the deployment intent, and the set of embeddings, wherein the hidden layer is coupled to the output layer of the ANN.

As shown in block 315, the functionality 300 includes, based on the probability score for each of the plurality of instances, selecting, by the network orchestrator, a first instance of the plurality of instances to associate with the network device. In an instance, the first instance has the highest probability score among the plurality of instances. As shown in block 320, the functionality 300 includes associating, by the network orchestrator, the network device to the first instance.

Figure 4:
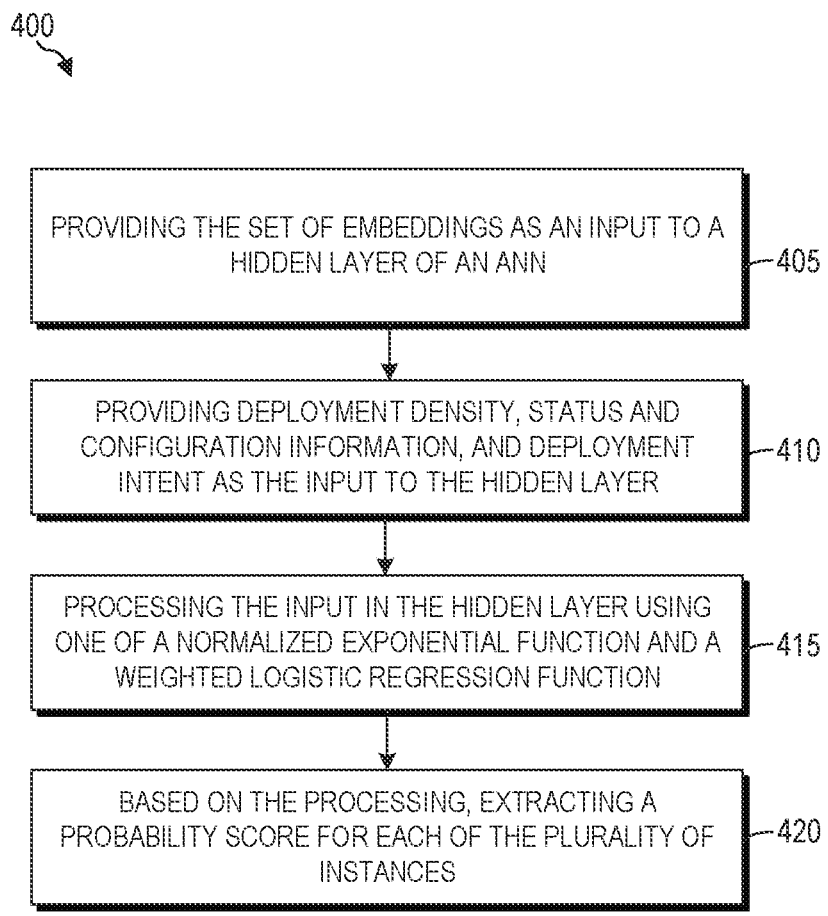
FIG. 4 shows an example functionality for determining a probability score for each of a plurality of instances of the network management system.

FIG. 4 shows an example functionality 400 for determining a probability score for each of a plurality of instances of network management system. Functionality 400 may be implemented as a method or may be executed as one or more instructions on a machine (e.g., by at least one processor), where the one or more instructions are included on at least one machine-readable storage medium (e.g., a non-transitory machine readable-storage medium.) While only four blocks are shown in functionality 400, functionality 400 may include other actions described herein. Additionally, although the blocks are shown in an order, blocks depicted in FIG. 4 may be performed in any order and at any time. Also, some of the blocks shown in functionality 400 may be omitted without departing from the spirit and scope of this disclosure. Functionality 400 may be implemented on a network orchestrator according to any of the examples herein.

As shown in in block 405, functionality 400 includes providing, by the network orchestrator, the set of embeddings as an input to a hidden layer (second hidden layer) of an ANN, wherein the hidden layer is coupled to an output layer of the ANN. The set of embeddings are indicative of characteristics of the network device and each of a plurality of instances of the NMS. The set of embeddings may be a combination of the first subset embeddings, the second subset of embeddings, and the third subset of embeddings and may be determined according to the techniques as described earlier.

As shown in block 410, functionality 400 includes providing, by the network orchestrator, the deployment density, the status and configuration information, and the deployment intent as an input to the hidden layer (i.e. the second hidden layer), wherein the hidden layer is coupled to an output layer of the ANN. Thus, the input provided to the second hidden layer of the ANN may include the set of embeddings, the deployment density, the status and configuration information, and the deployment intent. As shown in block 415, functionality 400 includes processing, by the network orchestrator, the input in the hidden layer (second hidden layer) using one of a normalized exponential function and a weighted logistic regression function. As shown in block 420, functionality 400 includes, based on the processing, extracting, by the network orchestrator, a probability score for each of the plurality of instances. As described earlier, based on the probability score for each of the plurality of instances, the network orchestrator may select a first instance of the plurality of instances to associate with the network device. Functionality 400 may also include associating, by the network orchestrator, the network device to the first instance.

Functionality 400 may include, based on the probability score of each of the plurality of instances, identifying, by the network orchestrator, a second instance of the plurality of instances to associate with the network device, wherein the second instance has a probability score lower that a probability score of the first instance. Functionality 400 may also include associating, by the network orchestrator, the network device to the second instance, in response to a failure in the first instance. Failure may occur in the first instance 220-1 when the first instance goes down or is unavailable. For instance, functionality 400 may include transmitting, by the network orchestrator, a network address of the first instance and a network address of the second instance to the network device along with association configuration, such as association configuration 180. The functionality 400 may include configuring, by the network orchestrator, the network device to associate with the second instance when the first instance of the NMS goes down.

Figure 5:
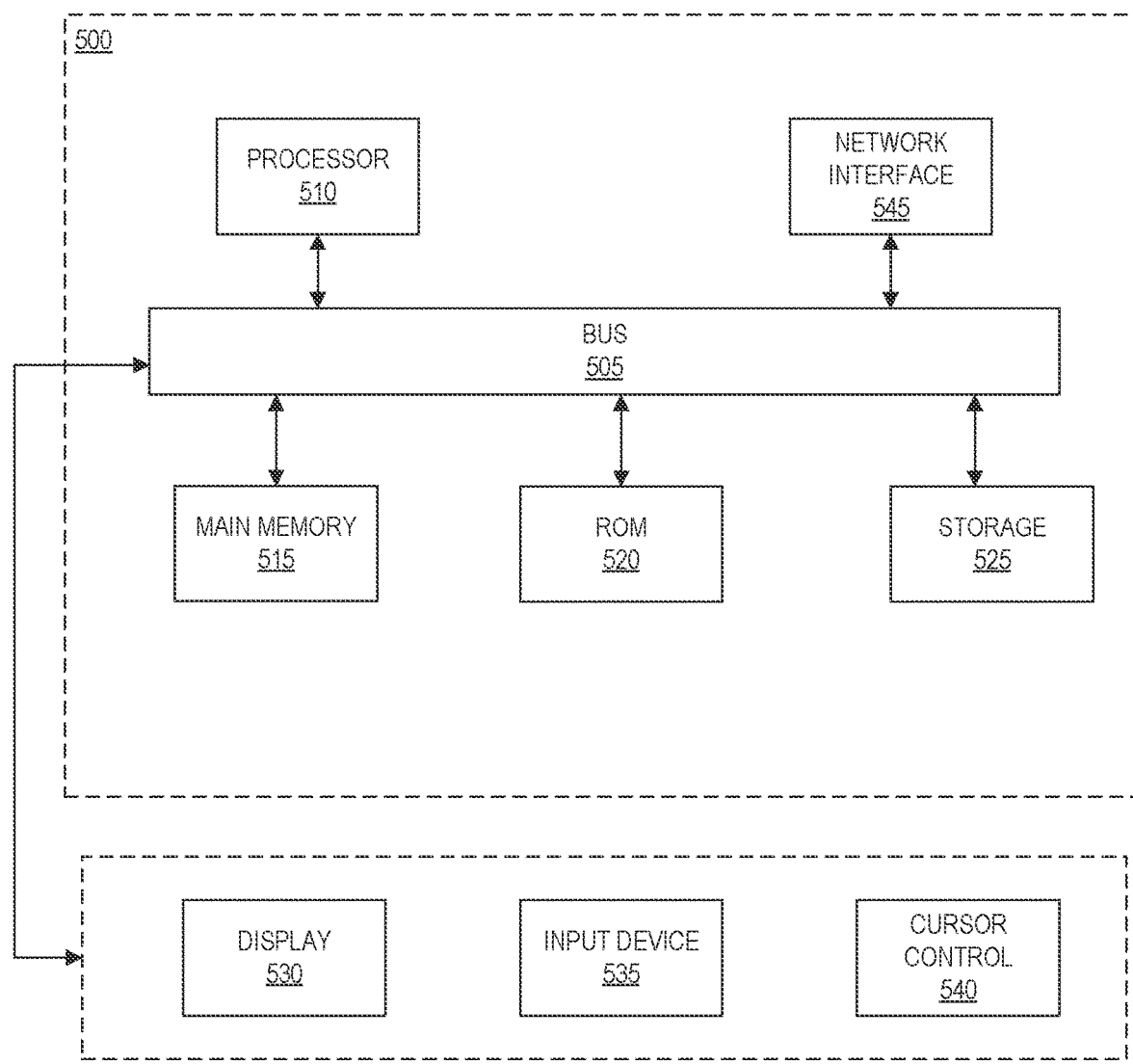
FIG. 5 is a block diagram of an example computer system for associating a network device to a network management system in which various embodiments described herein may be implemented.

FIG. 5 is a block diagram of an example computer system 500 for associating a network device to a network management system in which various embodiments described herein may be implemented.

Computer system 500 includes bus 505 or other communication mechanism for communicating information, at least one hardware processor 510 coupled with bus 505 for processing information. At least one hardware processor 510 may be, for example, at least one general purpose microprocessor.

Computer system 500 also includes main memory 515, such as random access memory (RAM), cache, other dynamic storage devices, or the like, or a combination thereof, coupled to bus 505 for storing information and one or more instructions to be executed by at least one processor 510. Main memory 515 also may be used for storing temporary variables or other intermediate information during execution of one or more instructions to be executed by at least one processor 510. Such one or more instructions, when stored on storage media accessible to at least one processor 510, render computer system 500 into a special-purpose machine that is customized to perform the operations specified in the one or more instructions.

Computer system 500 further includes read only memory (ROM) 520 or other static storage device coupled to bus 505 for storing static information and one or more instructions for at least one processor 510. At least one storage device 525, such as a magnetic disk, optical disk, or USB thumb drive (Flash drive), or the like, or a combination thereof, may be provided and coupled to bus 505 for storing information and one or more instructions.

Computer system 500 may further include display 530 coupled to bus 505 for displaying a graphical output to a user. The computer system 500 may further include input device 535, such as a keyboard, camera, microphone, or the like, or a combination thereof, coupled to bus 505 for providing an input from a user. Computer system 500 may further include cursor control 540, such as a mouse, pointer, stylus, or the like, or a combination thereof, coupled to bus 505 for providing an input from a user.

Computer system 500 may further includes at least one network interface 545, such as a network interface controller (NIC), network adapter, or the like, or a combination thereof, coupled to bus 505 for connecting computer system 500 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to at least one processor 510 executing one or more sequences of one or more instructions contained in main memory 515. Such one or more instructions may be read into main memory 515 from another storage medium, such as at least one storage device 525. Execution of the sequences of one or more instructions contained in main memory 515 causes at least one processor 510 to perform the process steps described herein. In alternative embodiments, hard-wired circuitry may be used in place of or in combination with software instructions.

In examples described herein, a "computing device" may be a server, storage device, storage array, desktop or laptop computer, switch, router, gateway, controller, access point, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

In examples described herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk drive (HDD)), a solid state drive, any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

In examples described herein, a network device may engage in any network data transmission operations, including, but not limited to, switching, routing, bridging, or a combination thereof. In some examples, a network device may comprise a WAP. A WAP refers to receiving points for any known or convenient wireless access technology which may later become known. Specifically, the term WAP is not intended to be limited to IEEE 802.11-based WAPs. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that network device may be any suitable type(s) of network devices made by any suitable manufacturer(s). A WAP may include one or more network interfaces. A network interface may comprise a network interface controller (NIC) having one or more ports (e.g., Ethernet ports), one or more sockets, one or more adapters, or a combination thereof. In addition, a network interface may comprise a radio having a specific MAC address. In some examples, one or more basic service set identifiers (BSSIDs) may correspond to the MAC address of a radio of a network interface. In some examples, a radio may operate at one or more frequency bands. For example, a radio may operate at a 5 GHz band which conforms to the IEEE 802.11ac standard, a 2.4 GHz band which conforms to one or more of the IEEE 802.11ac, 802.11n, and 802.11g standards, or a combination thereof. Each of the frequency bands may be divided into multiple WLAN channels. For example, the 2.4 GHz band may be divided into 11 channels and the 5 GHz band may be divided into 45 channels. It will be understood by one skilled in the art that a radio of a network interface may transmit and receive wireless signals that conform to any suitable type(s) of wireless communications standard(s), now known or later developed, and/or operate at any suitable frequency range(s).

In examples described herein, a "packet" (i.e., network packet) refers to a formatted unit of data which may be transmitted across one or more communication links of one or more networks. According to the OSI model, a packet refers to a protocol data unit (PDU) at the Layer 3 (L3) network layer. Moreover, under the Transmission Control Protocol/Internet Protocol (TCP/IP), a packet (i.e., IP packet) may comprise an IP header. An IP header comprises a source IP address and a destination IP address. In some examples, a packet may comprise a header and a payload. In such examples, an IP header may comprise control information for delivering the payload, such as source and destination information, sequencing information, service information, flagging information, other transmission-related information, or the like, or a combination thereof. In some examples, the payload may comprise data which is carried by the packet. It will be understood by one skilled in the art that a packet may comprise any suitable format(s) of units of data, now known or later developed.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

All of the features disclosed in this specification (including any accompanying claims, abstract and drawings), and/or all of the elements of any method or process so disclosed, may be combined in any combination, except combinations where at least some of such features and/or elements are mutually exclusive.

We claim:

1. A method for associating a network device to a network management system (NMS), comprising:
   determining, by a network orchestrator, a set of embeddings indicative of characteristics of the network device and each of a plurality of instances of the NMS;
   determining, by the network orchestrator for each of the plurality of instances, a probability score based on the set of embeddings, wherein the probability score is indicative of a likelihood of the network device to be associated with the instance;
   based on the probability score for each of the plurality of instances, selecting, by the network orchestrator, a first instance of the plurality of instances to associate with the network device; and
   associating, by the network orchestrator, the network device to the first instance.

2. The method of claim 1, wherein determining the set of embeddings comprises:
   providing, by the network orchestrator, an input to an input layer of an artificial neural network (ANN), wherein the input includes information on resource capability and supported features of each of the plurality of instances and the network device;
   processing, by the network orchestrator, the input in a hidden layer of the ANN using a dimensionality reduction technique, wherein the hidden layer is coupled to the input layer; and
   based on the processing, extracting, by the network orchestrator, the set of embeddings.

3. The method of claim 2, further comprising:
updating, by the network orchestrator, the input based on an update message received from at least one of the plurality of instances, wherein the update message is indicative of changes in resource capability and supported features in at least one of the plurality of instances.

4. The method of claim 1, wherein determining the set of embeddings comprises:
providing, by the network orchestrator, an input to an input layer of an ANN, wherein the input includes information on performance history of interaction between each of the plurality of instances and corresponding network devices;
processing, by the network orchestrator, the input in a hidden layer of the ANN using a collaborative filtering technique, wherein the hidden layer is coupled to the input layer; and
based on the collaborative filtering technique, extracting, by the network orchestrator, the set of embeddings.

5. The method of claim 1, wherein determining the set of embeddings comprises:
identifying, by the network orchestrator, a deployment location of the network device based on an out-of-band message from the network device;
determining, by the network orchestrator, a device sentiment score in a deployment site, wherein the device sentiment score is indicative of performance of corresponding network devices and associated instances in the deployment site;
obtaining, by the network orchestrator, customer purchase order history for the corresponding network devices and for each of the plurality of instances;
providing, by the network orchestrator, an input to an input layer of an ANN, wherein the input includes the deployment location, the device sentiment score, and the customer purchase order history;
processing, by the network orchestrator, the input in a hidden layer of the ANN using a knowledge-based recommendation technique, wherein the hidden layer is coupled to the input layer; and
based on the processing, extracting, by the network orchestrator, the set of embeddings.

6. The method of claim 1, wherein the method further comprises:
identifying, by the network orchestrator and based on an out-of-band message from the network device, deployment density of corresponding network devices in a deployment site;
determining, by the network orchestrator, a predictive client count based on status and configuration information of the corresponding network devices previously associated with each of the plurality of instances in the deployment site;
identifying, by the network orchestrator and based on the out-of-band message, a deployment intent for which the network device is expected to be operational; and
providing, by the network orchestrator, an input to a hidden layer of an ANN, wherein the input includes the deployment density, the status and configuration information, and the deployment intent, wherein the hidden layer is coupled to an output layer of the ANN.

7. The method of claim 1, further comprising:
based on the probability score of each of the plurality of instances, identifying, by the network orchestrator, a second instance of the plurality of instances to associate with the network device, the second instance having a probability score lower that a probability score of the first instance;
associating, by the network orchestrator, the network device to the second instance, in response to a failure in the first instance.

8. The method of claim 1, wherein the first instance has the highest probability score among the plurality of instances.

9. The method of claim 1, wherein determining the probability score comprises:
providing, by the network orchestrator, the set of embeddings as an input to a hidden layer of an ANN, wherein the hidden layer is coupled to an output layer of the ANN;
processing, by the network orchestrator, the input in the hidden layer using one of a normalized exponential function and a weighted logistic regression function; and
based on the processing, extracting, by the network orchestrator, the probability score for each of the plurality of instances.

10. A network orchestrator comprising:
a processor; and
a memory coupled to the processor, the memory storing instructions executable by the processor to:
determine a set of embeddings indicative of characteristics of a network device and each of a plurality of instances of a Network Management System (NMS);
determine, for each of the plurality of instances, a probability score based on the set of embeddings, wherein the probability score is indicative of a likelihood of the network device to be associated with the instance;
based on the probability score for each of the plurality of instances, select a first instance of the plurality of instances to associate with the network device; and
associate the network device to the first instance.

11. The network orchestrator of claim 10, wherein the instructions to determine the set of embeddings comprise instructions to:
provide an input to an input layer of an artificial neural network (ANN), wherein the input includes information on resource capability and supported features of each of the plurality of instances and the network device;
process the input in a hidden layer of the ANN using a dimensionality reduction technique, wherein the hidden layer is coupled to the input layer; and
extract the set of embeddings based on the dimensionality reduction technique.

12. The network orchestrator of claim 10, wherein instructions executable by the processor is further to:
update the input based on an update message received from at least one of the plurality of instances, wherein the update message is indicative of changes in resource capability and supported features in at least one of the plurality of instances.

13. The network orchestrator of claim 10, wherein the instructions to determine the set of embeddings comprise instructions to:
provide an input to an input layer of an ANN, wherein the input includes information on performance history of interaction between each of the plurality of instances and corresponding network devices;

process the input in a hidden layer of the ANN using a collaborative filtering technique, wherein the hidden layer is coupled to the input layer; and based on the collaborative filtering technique, extract the set of embeddings.

14. The network orchestrator of claim 10, wherein the instructions to determine the set of embeddings comprise instructions to:

identify a deployment location of the network device based on an out-of-band message from the network device;

determine a device sentiment score in a deployment site, wherein the device sentiment score is indicative of performance of corresponding network devices and associated instances in the deployment site;

obtain customer purchase order history for the corresponding network devices and for each of the plurality of instances;

provide an input to an input layer of an ANN, wherein the input includes the deployment location, the device sentiment score, and the customer purchase order history;

process the input in a hidden layer of the ANN using a knowledge-based recommendation technique, wherein the hidden layer is coupled to the input layer; and based on the processing, extract the set of embeddings.

15. The network orchestrator of claim 10, wherein the instructions executable by the processor is further to:

identify, based on an out-of-band message from the network device, deployment density of corresponding network devices in a deployment site;

determine a predictive client count based on status and configuration information of the corresponding network devices previously associated with each of the plurality of instances in the deployment site;

identify, based on the out-of-band message, a deployment intent for which the network device is expected to be operational; and provide an input to a hidden layer of an ANN, wherein the input includes the deployment density, the status and configuration information, and the deployment intent, wherein the hidden layer is coupled to an output layer of the ANN.

16. The network orchestrator of claim 10, wherein the instructions executable by the processor is further to:

based on the probability score of each of the plurality of instances, identify a second instance of the plurality of instances to associate with the network device, the second instance having a probability score lower that a probability score of the first instance;

associate the network device to the second instance, in response to a failure in the first instance.

17. The network orchestrator of claim 10, wherein the first instance has the highest probability score among the plurality of instances.

18. The network orchestrator of claim 10, wherein the instructions to determine the probability score comprise instructions to:

provide the set of embeddings as an input to a hidden layer of an ANN, wherein the hidden layer is coupled to an output layer of the ANN;

process the input in the hidden layer using one of a normalized exponential function and a weighted logistic regression function; and based on the processing, extract the probability score for each of the plurality of instances.

19. An article comprising at least one non-transitory machine-readable storage medium comprising instructions executable by at least one processor to:

determine a set of embeddings indicative of characteristics of a network device and each of a plurality of instances of a Network Management System (NMS);

determine, for each of the plurality of instances, a probability score based on the set of embeddings, wherein the probability score for an instance of the plurality of instances is indicative of a likelihood of the network device to be associated with the instance;

based on the probability score for each of the plurality of instances, select a first instance of the plurality of instances to associate with the network device; and associate the network device to the first instance.

20. The article of claim 19, wherein the instructions to determine the probability score comprise instructions to:

provide the set of embeddings as an input to a hidden layer of an ANN, wherein the hidden layer is coupled to an output layer of the ANN;

process the input in the hidden layer using one of a normalized exponential function and a weighted logistic regression function; and based on the processing, extract the probability score for each of the plurality of instances.

* * * * *